United States Patent
Jeong et al.

(10) Patent No.: US 9,210,632 B2
(45) Date of Patent: Dec. 8, 2015

(54) METHOD AND APPARATUS FOR SETTING UP CALL IN MOBILE COMMUNICATION SYSTEM

(71) Applicant: Samsung Electronics Co. Ltd., Suwon-si, Gyeonggi-do (KR)

(72) Inventors: Sang-Soo Jeong, Suwon-si (KR); Hee-Jeong Lee, Suwon-si (KR); Hye-Jeong Kim, Suwon-si (KR); Hwa-Jin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 13/854,365

(22) Filed: Apr. 1, 2013

(65) Prior Publication Data

US 2013/0258888 A1  Oct. 3, 2013

(30) Foreign Application Priority Data

Mar. 30, 2012  (KR) .................. 10-2012-0033607

(51) Int. Cl.
*H04L 12/26* (2006.01)
*H04W 36/14* (2009.01)
*H04W 36/00* (2009.01)

(52) U.S. Cl.
CPC .......... *H04W 36/14* (2013.01); *H04W 36/0022* (2013.01)

(58) Field of Classification Search
None
See application file for complete search history.

(56) References Cited

U.S. PATENT DOCUMENTS

| 8,400,931 | B2 | 3/2013 | Wong et al. |
| 2010/0195568 | A1 | 8/2010 | Iimori |
| 2010/0317375 | A1 | 12/2010 | Burbidge et al. |
| 2010/0329244 | A1 | 12/2010 | Buckley et al. |
| 2011/0176485 | A1* | 7/2011 | Pudney et al. ............. 370/328 |
| 2011/0199950 | A1* | 8/2011 | Klingenbrunn et al. ...... 370/311 |

FOREIGN PATENT DOCUMENTS

WO  2011/121172 A1  10/2011

* cited by examiner

*Primary Examiner* — Chi H Pham
*Assistant Examiner* — Fahmida Chowdhury
(74) *Attorney, Agent, or Firm* — Jefferson IP Law, LLP

(57) ABSTRACT

The time required to set up a voice call in an exemplary embodiment, in which Circuit Switched Fallback (CSFB) is used, is reduced to provide a voice call service to a User Equipment (UE) in a Long Term Evolution (LTE) system. If a voice call occurs in a UE while the UE accesses the LTE system, the UE using CSFB switches to a 2G/3G legacy system, recycles system information for a 2G/3G cell that the UE has accessed before, and immediately proceeds with voice call setup without receiving system information unnecessary for a CSFB process.

16 Claims, 5 Drawing Sheets

METHOD AND APPARATUS FOR SETTING UP CALL IN MOBILE COMMUNICATION SYSTEM

PRIORITY

This application claims the benefit under 35 U.S.C. §119 (a) of a Korean patent application filed on Mar. 30, 2012 in the Korean Intellectual Property Office and assigned Serial No. 10-2012-0033607, the entire disclosure of which is incorporated herein by reference.

BACKGROUND OF THE INVENTION

1. Field of the Invention

The present invention relates to a mobile communication system. More particularly, the present invention relates to a method and apparatus for setting up a voice call during a Circuit Switched Fallback (CSFB) service.

2. Description of the Related Art

Mobile communication systems have been developed to provide voice services while ensuring a user's activity. However, the mobile communication systems have extended their coverage to include data services beyond the voice services. At present, the mobile communication systems have been developed to be able to provide high-speed data services as well. However, mobile communication systems according to the related art suffer a lack of resources and user demand for higher-speed services continually increases. Thus, further advanced wireless communication systems are required.

To meet the demands for advanced wireless communication systems, the 3rd Generation Partnership Project (3GPP) has been proceeding with standardization for a Long Term Evolution (LTE) communication system as one of the next-generation communication systems under development. The LTE system generally supports only packet services. Hence, the LTE standard proposes a Circuit Switched Fallback (CSFB) service to provide voice calls to users.

FIG. 1 illustrates configuration of a general system that uses a CSFB function according to the related art.

Referring to FIG. 1, the CSFB service refers to a service, in which if a voice call occurs for a User Equipment (UE) 150 that camps on an LTE system 130 connected to an Evolved Packet Core (EPC) 110, the UE 150 is handed over to an existing 2G/3G legacy system 120 so as to be connected to the voice call. The EPC 110 and the existing 2G/3G legacy system 120 are operatively connected to a Mobile Switching Center (MSC) 100.

According to the CSFB process, the UE 150 may perform handover from the LTE system 130 to the 2G/3G legacy system 120 as illustrated in FIG. 1. In order for the UE 150 to have access to the 2G/3G legacy system 120, the UE 150 must receive system information from the 2G/3G legacy system 120. The system information may be divided into multiple blocks depending on the contents included therein, and each System Information Block (SIB) is repeatedly broadcasted at intervals of a few milliseconds to a few seconds depending on the system settings.

As described above, in order for the UE 150 to access the 2G/3G legacy system 120, the UE 150 must receive system information from the 2G/3G legacy system 120 at regular intervals, thereby causing significant degradation of the Quality of Service (QoS) that the UE 150 experiences. In contrast to the process for setting up a voice call directly in the existing 2G/3G legacy system 120, setting up a voice call using CSFB requires an additional process of switching from the LTE system 130 to the 2G/3G legacy system 120 and receiving system information from the 2G/3G legacy system 120. As a result of the time required for handling the additional process is longer, the QoS that the UE experiences may degrade more significantly.

Therefore, a need exists for a method and apparatus for reducing the time required to set up a voice call in an environment in which CSFB is used.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for reducing the time required to set up a voice call in an environment in which Circuit Switched Fallback (CSFB) is used, thereby to provide a voice call service to a User Equipment (UE) in a mobile communication system.

Another aspect of the present invention is to provide a method and apparatus for preventing degradation of the QoS that a UE's user experiences.

In accordance with an aspect of the present invention, a method for setting up a call by a UE in a mobile communication system is provided. The method includes switching from a first communication system based on a high-speed packet to a second communication system based on a voice call, if a voice call occurs in the UE while the UE accesses the first communication system, determining whether reception of system information required for CSFB from the second communication system is completed, and performing a CSFB procedure without reception of additional system information, if the reception of system information required for CSFB is completed.

In accordance with another aspect of the present invention, an apparatus for setting up a call by a UE in a mobile communication system is provided. The apparatus includes a controller for switching from a first communication system based on a high-speed packet to a second communication system based on a voice call if a voice call occurs in the UE while the UE accesses the first communication system, for determining whether reception of system information required for CSFB in system information from the second communication system is completed, and for performing a CSFB procedure without reception of additional system information if the reception of system information required for CSFB is completed.

In accordance with another aspect of the present invention, a method for setting up a call by a UE in a mobile communication system is provided. The method includes switching from a first communication system based on a high-speed packet to a second communication system based on a voice call, if a voice call occurs in the UE while the UE accesses the first communication system, receiving system information required for CSFB from the second communication system, determining whether the system information required for CSFB is consistent with pre-stored system information, and performing a CSFB procedure without reception of additional system information, if the system information required for CSFB is consistent with pre-stored system information.

In accordance with another aspect of the present invention, an apparatus for setting up a call in a mobile communication system is provided. The apparatus includes a controller for switching from a first communication system based on a high-speed packet to a second communication system based on a voice call, if a voice call occurs in a UE while the UE accesses the first communication system, and a receiver for receiving system information required for CSFB from the second communication system. The controller is configured to determine whether the system information required for CSFB is consistent with pre-stored system information, and is configured to perform a CSFB procedure without reception of additional system information, if the system information required for CSFB is consistent with pre-stored system information.

In accordance with another aspect of the present invention, a method for setting up a call in a mobile communication system is provided. The method includes sending a message for initiating CSFB and performing measurement, if a voice call occurs in a UE that has been accessing a communication system based on a high-speed packet, and upon receiving a measurement command from an evolved Node B (eNB), transmitting the measurement results to the eNB and performing a CSFB procedure.

In accordance with another aspect of the present invention, an apparatus for setting up a call in a mobile communication system is provided. The apparatus includes a controller for sending a message for initiating CSFB and performing measurement, if a voice call occurs in a UE that has been accessing a communication system based on a high-speed packet, and for, upon receiving a measurement command from an eNB, transmitting the measurement results and performing a CSFB procedure.

In accordance with another aspect of the present invention, a method for setting up a call in a mobile communication system is provided. The method includes sending a message for initiating CSFB, if a voice call occurs in a UE that has been accessing a communication system based on a high-speed packet, and performing a CSFB procedure, upon receiving from an eNB a command message for commanding to switch from the communication system based on a high-speed packet to a communication system based on a circuit.

In accordance with another aspect of the present invention, an apparatus for setting up a call in a mobile communication system is provided. The apparatus includes a transmitter for sending a message for initiating CSFB, if a voice call occurs in a UE that has been accessing a communication system based on a high-speed packet, and a controller for performing a CSFB procedure, upon receiving from an eNB a command message for commanding to switch from the communication system based on a high-speed packet to a communication system based on a circuit based.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
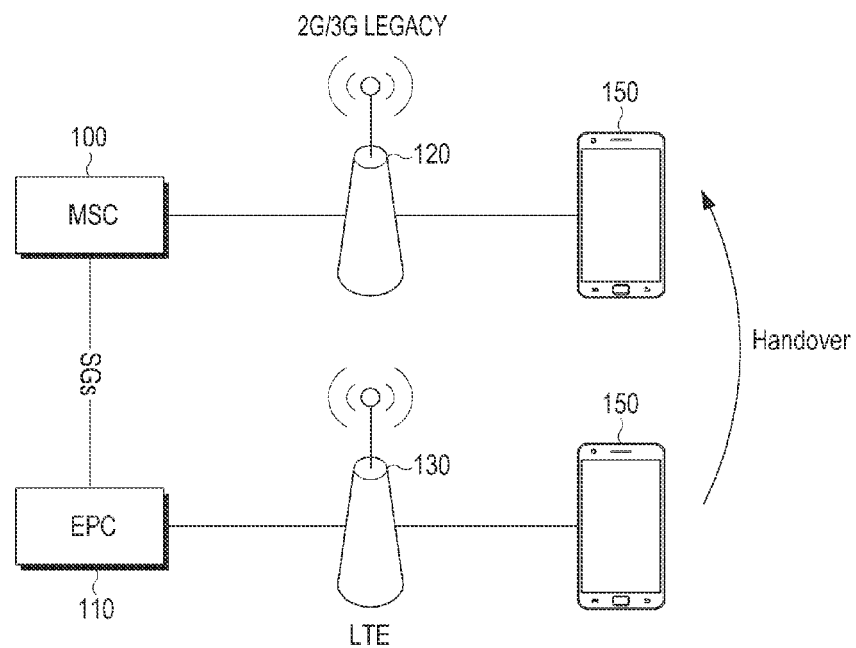
FIG. 1 illustrates configuration of a general system that uses a Circuit Switched Fallback (CSFB) function according to the related art.

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'System Information Block (SIB)', 'system information' and 'cell information' as used herein will be used interchangeably in the same meaning in a mixed manner. In addition, the term 'key system information' as used herein may refer to the system information essential for a Circuit Switched Fallback (CSFB), which corresponds to system information required for the CSFB. The system information required for the CSFB includes, for example, a SIB 1 to a SIB 10.

Although specific systems such as a Long Term Evolution (LTE) system and/or the 2G/3G legacy system will be considered in this specification, it will be apparent to those of ordinary skill in the art that exemplary embodiments of the present invention are not limited to these systems, but may be applied to any other systems in the similar technical fields.

Exemplary embodiments of the present invention provide a method and apparatus for reducing the time required to set up a voice call in an environment in which CSFB is used for providing a voice call service to a UE in an LTE system.

Exemplary embodiments of the present invention provide a method for switching to a 2G/3G legacy system and then receiving a voice call in an optimized way, if the voice call occurs in a UE that uses CSFB and that has been accessing an LTE system.

Exemplary embodiments of the present invention propose the following five approaches to reduce the time required to set up a voice call in an environment in which CSFB is used.

First, after switching to the 2G/3G legacy system and thereafter receiving all cell information (e.g., system information or SIB) therefrom, a UE with a CSFB function receives a voice call without receiving some SIBs (e.g., a SIB 11 and a SIB 12) which are not presently required for the CSFB. For example, the UE having a CSFB function receives a voice call by accessing the 2G/3G system without receiving an SIB 11 and an SIB 12 thereby reducing the time required to set up the voice call. Information of the SIB is divided into several different types. In particular, information of the SIB 11, which includes information related to neighbor cells, is not urgently required in this particular situation. In this case, therefore, information of the SIB 11 may be received at a later time. As a result and because the SIB 11 and the SIB 12 are not immediately required for the CSFB function, the UE may reduce the time required to set up a voice call by not immediately receiving the SIB 11 and SIB 12. For more detail on such a process, the operation thereof will be described below with reference to FIG. 6.

Second, when a UE camps on a cell in the existing 2G/3G legacy system, the UE with a CSFB function (e.g., a CSFB UE) may store system information for two or more cells without discarding the system information previously acquired for the cells. The UE may store information for two or more cells without discarding the system information acquired for the cells because the UE needs to determine whether the cell information stored therein is now valid in the cell in order to receive a voice call, when the UE accesses the 2G/3G legacy system. The UE may store the cell information in a list. If the UE determines that the stored cell information is valid, the UE may receive the voice call using the pre-stored cell information without additionally receiving cell information, thereby potentially reducing the time required to set up a voice call. For more detail on such a process, the operation thereof will be described below with reference to FIG. 5.

Third, the UE with a CSFB function according to the related art switches to an idle mode to receive system information and receives cell information, upon its entry into a new 2G/3G system, and thereafter switches to a connected mode and receives the service if necessary. In contrast, according to exemplary embodiments of the present invention, when the UE uses the 2G/3G legacy system for the CSFB function, the UE may directly transition to the connected mode and receive the service, without switching to the idle mode.

Fourth, by modifying the structure of a UE to a dual radio structure rather than a single radio structure, it is possible to perform measurement for a cell of the 2G/3G system at the time the CSFB function is triggered. According to a further optimized method, a measurement-dedicated receiver for the 2G/3G system may be additionally provided, and the LTE system sends an Extended Service Request (ESR) message (e.g., a message indicating its execution of the CSFB service) and performs measurement on the cell of the 2G/3G system. For more detail on such a process, the operation thereof will be described below with reference to FIG. 4.

Fifth, according to an optimized method from the viewpoint of the LTE system, after the ESR is performed, a CSFB UE may minimize the CSFB service time by omitting the optional security procedure that was performed in the LTE system according to the related art. For more detail on such a process, the operation thereof will be described below with reference to FIG. 3.

Exemplary embodiments of the present invention may apply the foregoing approaches individually or collectively, and the application of the approaches is not limited.

Figure 2:
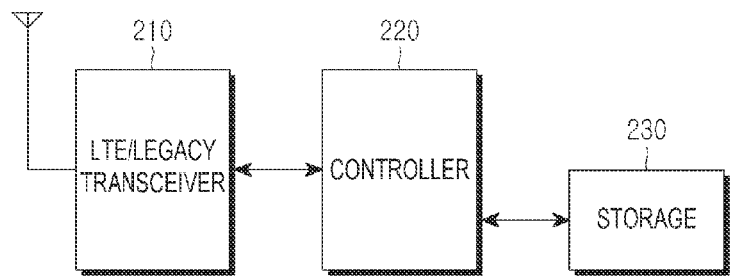
FIG. 2 is a block diagram of a User Equipment (UE) according to an exemplary embodiment of the present invention.

FIG. 2 is a block diagram of a UE according to an exemplary embodiment of the present invention.

Referring to FIG. 2, the UE includes an LTE/legacy transceiver 210, a controller 220, and a storage 230.

The controller 220 controls and handles the overall operation of the UE (e.g., performing voice calls, performing data calls, executing an application, and the like), sends a request to the system during a CSFB process, or handles (e.g., processes) a command message received from the system, and operates according thereto. The UE receives through the LTE/legacy transceiver 210 information about the cell on which the UE camps, or the cells for which the UE has performed measurement, and stores the received information in the storage 230.

Figure 3:
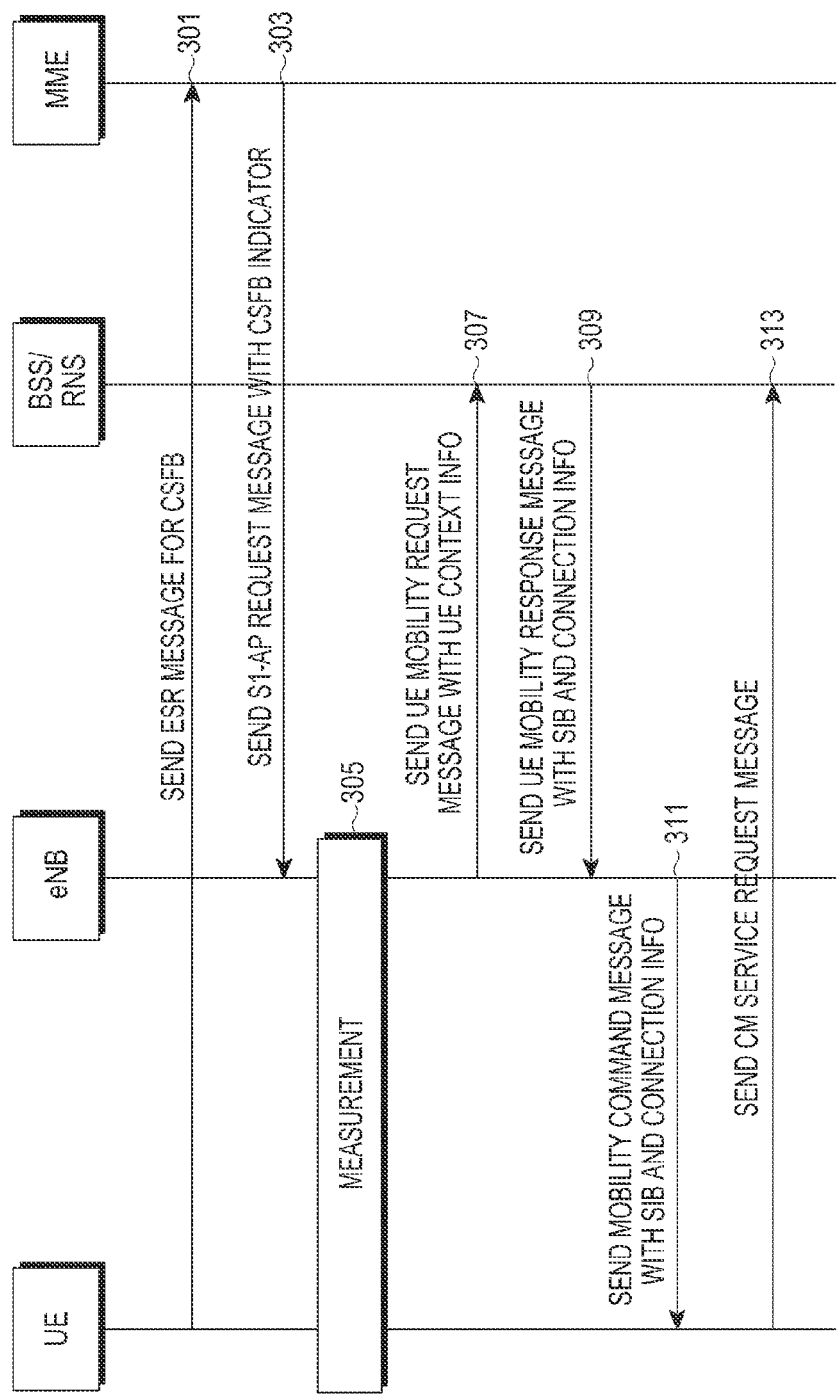
FIG. 3 illustrates an operation of performing a CSFB process according to an exemplary embodiment of the present invention.

FIG. 3 illustrates an operation of performing a CSFB process according to an exemplary embodiment of the present invention.

Referring to FIG. 3, a UE initiates a CSFB process by initiating a user's outgoing call in the case of Mobile Originating (MO), and by receiving a paging message from the LTE system in the case of Mobile Terminating (MT). If the CSFB process is initiated for an MO call or an MT call, the UE sends an ESR message to a Mobile Management Entity (MME) to initiate the CSFB process in step 301. A detailed description of the CSFB initiation process will be omitted in this specification.

Upon receiving the ESR message for a CSFB process from the UE, the MME sends a request message indicating that the UE should switch to a 2G/3G network for CSFB, to an evolved Node B (eNB) in step 303. The request message may correspond to an S1-AP request message, and may include a CSFB indicator.

Upon receiving the request message, the eNB selects the 2G/3G cell to which the UE should switch for CSFB (e.g., performs a measurement process if necessary) in step 305.

In step 307, the eNB sends a message indicating that the UE needs to switch for the CSFB process to a 2G/3G Base Station Subsystem (BSS)/Radio Network Subsystem (RNS) for the cell. The message transmitted by the eNB to the BSS/RNS may include parameter(s) that the UE should use during an initial access in the 2G/3G network. In this process, the eNB may deliver UE information (e.g., UE identifier, security context, UE context information, and the like) to the BSS/RNS.

Upon receiving the UE information, the BSS/RNS sends initial access information (e.g., SIB information and channel setup information) to the eNB in step 309. As an example, the initial access information transmitted by the BSS/RNS to the eNB may be based on which the UE may perform CSFB in 2G/3G. In this process, the BSS/RNS may reserve in advance the wireless resources that the UE may use when proceeding with a CS call.

Upon receiving the information, the eNB sends to the UE the information that the eNB received from the BSS/RNS in step 311. The eNB may send such information to the UE together while sending a command to switch to the 2G/3G for CSFB.

In step 313, the UE may immediately start the CS call setup process without any extra process of receiving information because the UE has received in advance the information required during initial access in the 2G/3G cell, from the eNB. Through this process, the CS call setup time for the user may be reduced.

Figure 4:
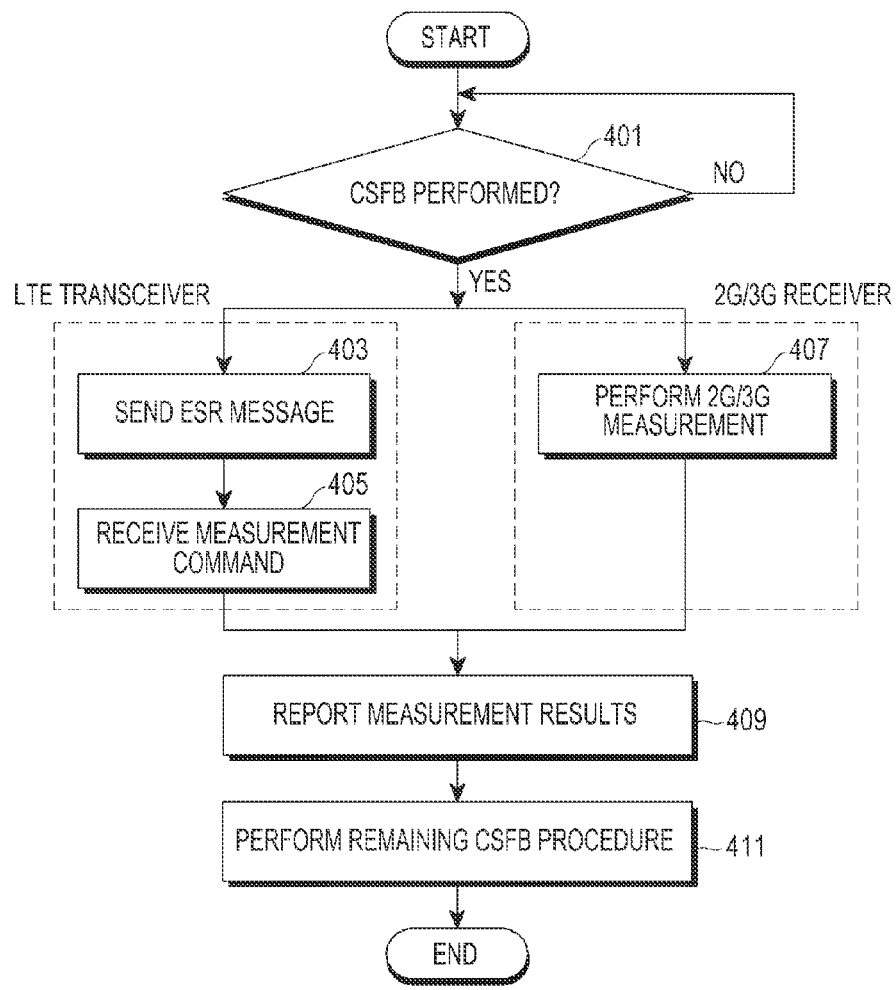
FIG. 4 illustrates an operation of a UE for performing a CSFB process according to an exemplary embodiment of the present invention.

FIG. 4 illustrates an operation of a UE for performing a CSFB process according to an exemplary embodiment of the present invention.

Referring to FIG. 4, in step 401, the UE determines whether CSFB is performed. If the UE determines that CFSB is not performed, the UE may continue to poll for an indication that CFSB is to be performed. If the UE determines that CSFB is performed, the UE may operatively simultaneously perform the existing CSFB process and the measurement process. In other words, the UE includes both an LTE transceiver for performing the operations of steps 403 and 405, and a 2G/3G receiver for performing the measurement operation of step 407.

If the CSFB process is performed, the LTE transceiver performs the existing CSFB process and at the same time, the 2G/3G receiver performs the measurement process for the neighbor 2G/3G cells in parallel.

In step 403, the LTE transceiver sends an ESR message in the CSFB process.

In step 405, the UE receives a measurement command from the eNB.

Thereafter, upon receiving a measurement command from the eNB, the UE reports the measurement results that the 2G/3G receiver has obtained using the LTE transceiver in step 409.

In step 411, the UE performs the remaining CSFB procedure. In other words, if CSFB is required, in contrast to the related art which can perform the measurement process only after receiving a measurement command during the CSFB process, according to exemplary embodiments of the present invention, the UE may perform in advance the measurement for the 2G/3G cells, and transmit the measurement results upon receiving a measurement command, thereby potentially reducing the time required for the CSFB process.

Figure 5:
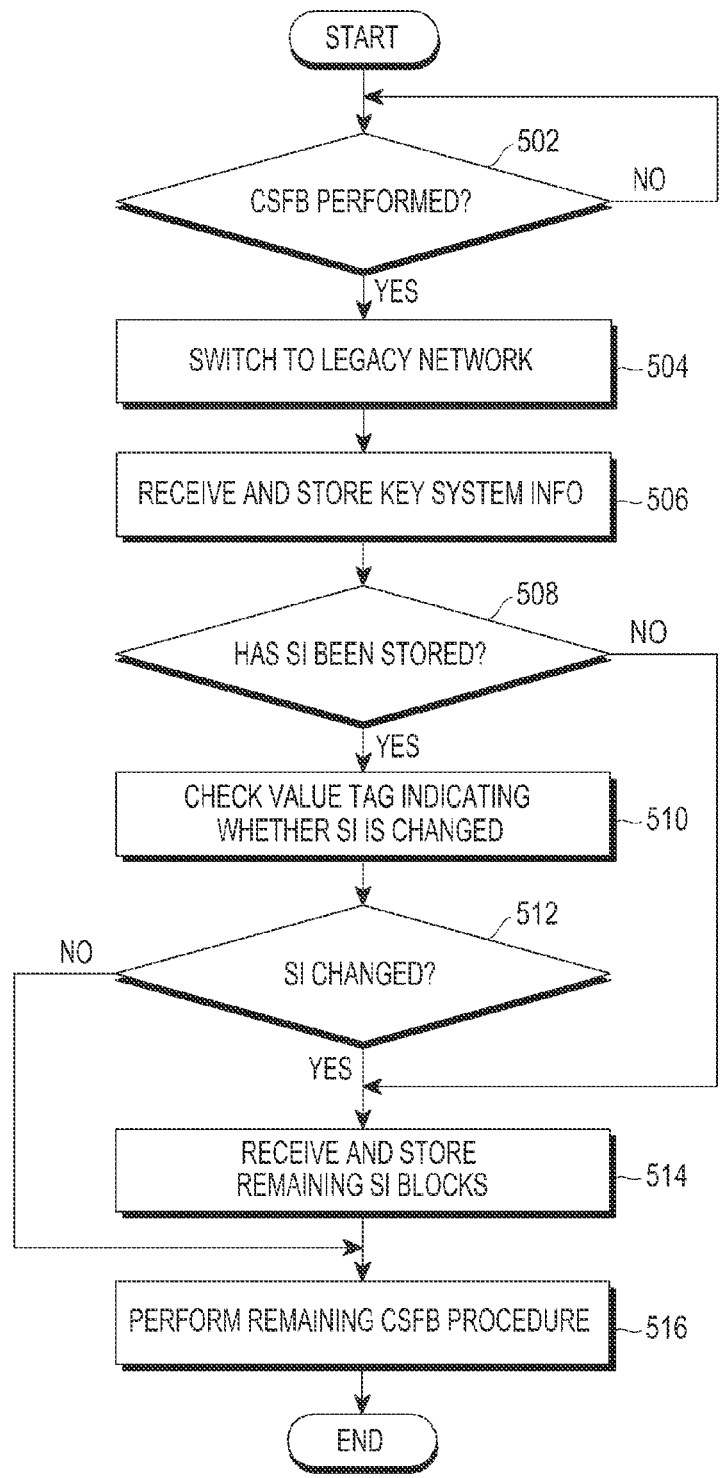
FIG. 5 illustrates an operation of a UE for performing a CSFB process according to an exemplary embodiment of the present invention.

FIG. 5 illustrates an operation of a UE for performing a CSFB process according to an exemplary embodiment of the present invention.

Referring to FIG. 5, in step 502, the UE initiates a CSFB process by initiating a user's outgoing call in the case of an MO call, and by receiving a paging message from the LTE system in the case of an MT call. A detailed description of the CSFB initiation process will be omitted in this specification. In step 502, the UE determines whether a CSFB process is to be performed. If the UE determines that a CSFB process is not performed, the UE may continue to poll for an indication that CFSB is to be performed. In contrast, if the UE determines that a CSFB process is performed, the UE proceeds to step 504.

In step 504, the UE receives from the eNB a command message for commanding to switch to the 2G/3G legacy system, for the CSFB process. The message used in this process may include a Radio Resource Control (RRC) Connection Release message. The UE switches to the relevant cell using the information (e.g., cell information of a 2G or 3G network) contained in the command message, and performs an initial access process (physical frequency channel synchronization).

Thereafter, in step 506, the UE receives and stores key system information (e.g., Master Information Blocks (MIBs) and Scheduling Blocks (SBs)). The key system information may include the number of SIBs broadcasted from the system, transmission scheduling information (e.g., channel positions in the time and frequency domains), and a value tag indicating whether SIBs are modified.

In step 508, the UE determines whether the UE has stored in the storage 230 the system information of the cell to which the UE switched. If the UE has not stored the system information, the UE proceeds to step 514 in which the UE receives and stores the remaining SIBs other than the key system information.

In step 516, the UE performs the remaining CSFB procedure without performing the reception of the system information any longer.

In contrast, if the UE has stored the system information at step 508, the UE proceeds to step 510 in which the UE compares the received key system information with the pre-stored system information.

Thereafter, the UE proceeds to step 512, in which the UE determines whether the system information is changed. If the UE determines that the system information is not changed in step 512, then the UE proceeds to step 516 in which the UE performs the remaining CSFB procedure without performing the reception of the system information any longer.

Conversely, if the UE determines that the system information is changed in step 512, then the UE receives and stores the remaining SIBs in step 514, and performs the remaining CSFB procedure in step 516 (e.g., sends an RRC connection request and then performs a succeeding process). If the UE has not stored in the storage 230 the system information for the cell, to which the UE switched, the UE receives the remaining SIBs other than the key system information, and then performs the remaining CSFB process. As the key system information includes a value tag for each SIB, the UE may receive only the modified blocks among all the SIBs, and then perform the remaining CSFB processes. The UE may store the received system information in the storage and use such received system information later on.

Figure 6:
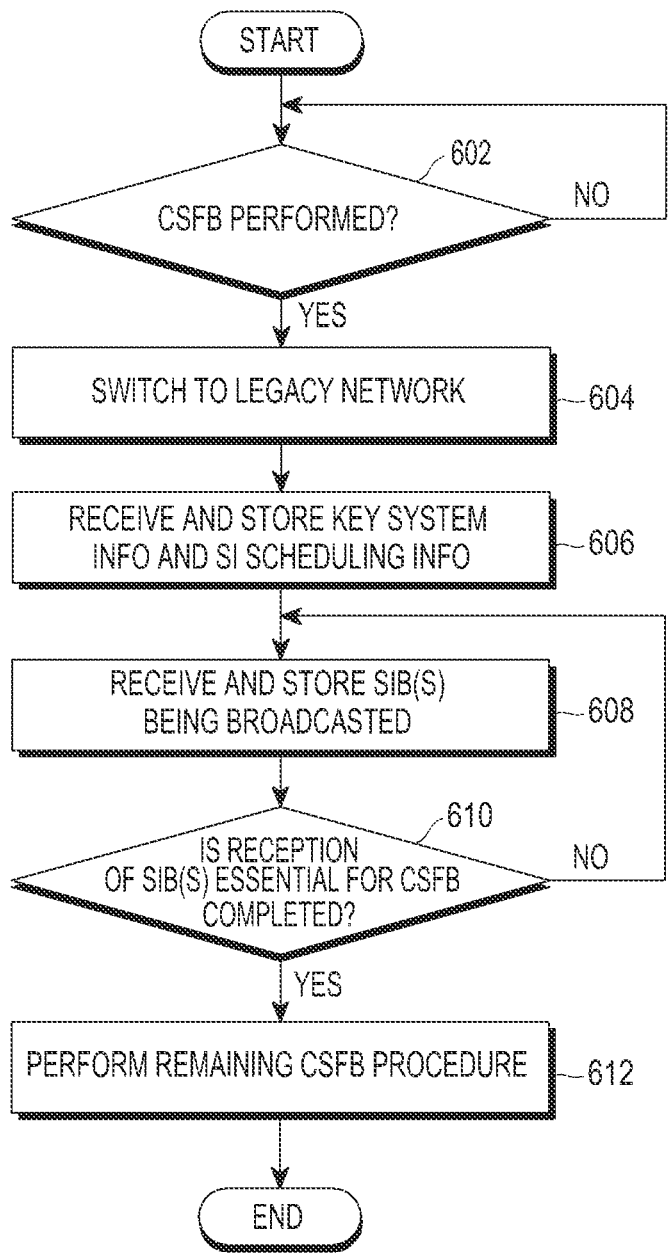
FIG. 6 illustrates an operation of a UE for performing a CSFB process according to an exemplary embodiment of the present invention.

FIG. 6 illustrates an operation of a UE for performing a CSFB process according to an exemplary embodiment of the present invention.

Referring to FIG. 6, in step 602, the UE initiates a CSFB process by initiating an outgoing call in the case of an MO call, and by receiving a paging message from the LTE system in the case of an MT call. In step 602, the UE determines whether a CSFB process is to be performed. If the UE determines that a CSFB process is not performed, the UE may continue to poll for an indication that CFSB is to be performed. In contrast, if the UE determines that a CSFB process is performed, the UE proceeds to step 604.

In step 604, the UE receives a command message for commanding to switch to the 2G/3G legacy system, from the eNB for the CSFB process. The message used in this process may include an RRC Connection Release message. The UE switches to the relevant cell using the information (e.g., cell information of a 2G or 3G network) contained in the command message, and performs an initial access process (physical frequency channel synchronization).

Thereafter, in step 606, the UE receives and stores key system information (e.g., MIBs and SBs). The key system information may include the number of SIBs broadcasted from the system, transmission scheduling information (e.g., channel positions in the time and frequency domains), and a value tag indicating whether SIBs are modified.

In step 608, the UE receives SIBs based on the scheduling information for the system information. Some of the SIBs may not be essential in the process in which the UE sets up a voice call in the 2G/3G cell using the CSFB. For example, the system information, which is not essential for CSFB, includes an SIB 11 or an SIB 12 and the system information essential for CSFB includes SIB 1~SIB 10. According to exemplary embodiments of the present invention, an indication or identification as to which of the SIBs are essential or inessential in the CSFB process may be set in advance in the UE, or may be set using Management Object of Open Mobile Alliance (OMA) Device Management (DM).

In step 610, the UE determines whether the SIBs are essential for the CSFB. The UE may determine whether the SIBs are essential for the CSFB while receiving and storing SIBs depending on the scheduling information. According to exemplary embodiments of the present invention, step 610 may be repeated until all the SIBs essential for CSFB are received. If all the SIBs which are set to be essential are received in the CSFB process, the UE proceeds to step 612.

In step 612, the UE immediately performs the remaining CSFB process (e.g., sends an RRC Connection request and then performs a succeeding process) even though the reception of some SIBs, which are set to be unnecessary in the CSFB process, is not completed. In this case, the UE may indicate the UE's access to the 2G or 3G legacy system by adding indication to the RRC Connection Request message without receiving some of the SIBs.

If the UE continuously uses the 2G or 3G legacy system after the voice call through the CSFB process is terminated, and the UE needs to receive the remaining SIBs that the UE has not received. In this case, the UE may receive the remaining SIBs that the UE has not received spontaneously. If the UE includes, in an RRC Connection Request message, information indicating that the UE has attempted the access without receiving some system information as described above, the eNB may directly deliver the SIBs that the UE has not received, using RRC messages (e.g., RRC Connection Release message).

As described above, it will be apparent to those of ordinary skill in the art that exemplary embodiments of the present invention (e.g., exemplary embodiments of the present invention illustrated in FIGS. 5 and 6) may be used in combination. Specifically, the UE may receive key system information and determine whether the received key system information is consistent with its stored system information in accordance with FIG. 5. If the UE needs to newly receive system information as the system information is modified, the UE may additionally receive only the system information necessary in the CSFB process and immediately performs CSFB, as described in conjunction with FIG. 4.

Exemplary embodiments of the present invention may be implemented as computer-readable codes in non-transitory computer-readable recording media. The non-transitory computer-readable recording media may include all kinds of recording devices storing computer-readable data. Examples of the recording media may include Read Only Memories (ROMs), Random Access Memories (RAMs), Compact Disk (CD)-ROMs, magnetic tapes, floppy disks, and optical data storage devices, and may also be implemented in the form of carrier waves (for example, transmission over the Internet).

As is apparent from the foregoing description, if a voice call occurs in a UE that has been accessing an LTE system, the UE switches from the LTE system to a 2G/3G legacy system, and then recycles the system information broadcasted from the 2G/3G system that the UE has accessed before, thereby making improvement in the QoS that the UE experiences possible.

Exemplary embodiments of the present invention may reduce the time required to start a voice call using a method of immediately proceeding with the voice call setup without receiving system information unnecessary in the CSFB process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a circuit switched fallback (CSFB) procedure by a terminal in a mobile communication system, the method comprising:
    receiving a first control message including switching information from a first communication system based on a packet switched service to a second communication system based on a circuit switched service, from a base station;
    switching a serving cell from a first cell of the first communication system to a second cell of the second communication system based on the switching information;
    receiving first information from the second cell;
    determining whether second information of the second cell is stored;
    determining whether the second information has been changed based on a value tag included in the first information if the second information is stored; and
    transmitting a second control message without reception of the second information to the second cell if the value tag indicates that the second information has not been changed,
    wherein the second information is previously acquired in the second communication system.

2. The method of claim 1, wherein the first information includes at least one of a number of system information blocks (SIBs), scheduling information, and a value tag indicating whether SIBs are modified.

3. An apparatus for performing a circuit switched fallback (CSFB) procedure by a terminal in a mobile communication system, the apparatus comprising:
    a transceiver configured to receive and transmit a signal; and
    a controller configured to receive a first control message including switching information from a first communication system based on a packet switched service to a second communication system based on a circuit switched service, from a base station, to switch a serving cell from a first cell of the first communication system to a second cell of the second communication system based on the switching information, to receive first information from the second cell, to determine whether second information of the second cell is stored, to determine whether the second information has been changed based on a value tag included in the first information if the second information is stored, and to transmit a second control message without reception of the second information to the second cell if the value tag indicates that the second information has not been changed,
    wherein the second information is previously acquired in the second communication system.

4. The apparatus of claim 3, wherein the first information includes at least one of a number of system information blocks (SIBs), scheduling information, and a value tag indicating whether SIBs are modified.

5. The method of claim 1, wherein the first information includes essential system information for CSFB procedure.

6. The method of claim 1, wherein the first control message includes a radio resource control (RRC) connection release message.

7. The method of claim 1, further comprising:
    receiving the second information if the second information is not stored.

8. The method of claim 1, further comprising:
receiving the second information if the value tag indicates that the second information has been changed.

9. The method of claim 1, wherein the second control message includes an RRC connection request message.

10. The apparatus of claim 3, wherein the first information includes essential system information for CSFB procedure.

11. The apparatus of claim 3, wherein the first control message includes a radio resource control (RRC) connection release message.

12. The apparatus of claim 3, wherein the controller is further configured to receive the second information if the second information is not stored.

13. The apparatus of claim 3, wherein the controller is further configured to receive the second information if the value tag indicates that the second information has been changed.

14. The apparatus of claim 3, wherein the second control message includes an RRC connection request message.

15. The method of claim 8, further comprising:
storing the received second information.

16. The apparatus of claim 13, wherein the controller is configured to store the received second information.

\* \* \* \* \*